United States Patent
Roy et al.

(10) Patent No.: US 7,831,571 B2
(45) Date of Patent: Nov. 9, 2010

(54) ANONYMIZING SELECTED CONTENT IN A DOCUMENT

(75) Inventors: Prasan Roy, New Delhi (IN); Mukesh Kumar Mohania, New Delhi (IN); Venkat Chakravarthy, New Delhi (IN); Himanshu Gupta, Etah (IN)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 11/923,825

(22) Filed: Oct. 25, 2007

(65) Prior Publication Data

US 2009/0112867 A1    Apr. 30, 2009

(51) Int. Cl.
*G06F 21/24* (2006.01)
*G06F 17/30* (2006.01)

(52) U.S. Cl. .................... 707/694; 707/783
(58) Field of Classification Search .............. None
See application file for complete search history.

(56) References Cited

U.S. PATENT DOCUMENTS

| | | | |
|---|---|---|---|
| 7,130,858 B2 * | 10/2006 | Ciaramitaro et al. | 707/101 |
| 7,184,947 B2 * | 2/2007 | Matsuoka et al. | 704/8 |
| 7,386,550 B2 * | 6/2008 | Brun | 707/9 |
| 7,401,082 B2 * | 7/2008 | Keene et al. | 707/9 |
| 2005/0004951 A1 * | 1/2005 | Ciaramitaro et al. | 707/104.1 |
| 2005/0138110 A1 | 6/2005 | Redlich et al. | |
| 2006/0075228 A1 * | 4/2006 | Black et al. | 713/167 |
| 2006/0253418 A1 * | 11/2006 | Charnock et al. | 707/1 |
| 2007/0038437 A1 * | 2/2007 | Brun | 704/9 |
| 2007/0094594 A1 * | 4/2007 | Matichuk et al. | 715/530 |
| 2008/0204788 A1 * | 8/2008 | Kelly et al. | 358/1.15 |
| 2009/0164878 A1 * | 6/2009 | Cottrille | 715/210 |
| 2009/0216691 A1 * | 8/2009 | Borzestowski et al. | 706/11 |

OTHER PUBLICATIONS

Brun et al., "Intertwining Deep Syntactic Processing and Named Entity Detection", Oct. 20, 2004, Springer Berlin / Heidelberg, vol. 3230/2004, pp. 195-206.*

* cited by examiner

*Primary Examiner*—Pierre M Vital
*Assistant Examiner*—Christopher P Nofal
(74) *Attorney, Agent, or Firm*—Gibb I.P. Law Firm, LLC

(57) ABSTRACT

A method and system for anonymizing selected content in a document, by receiving as input a document comprising content; assigning user access privileges to identified users based on an access control policy, the access control policy for the user based on a context and a set of pre-defined named entities stored in a repository; identifying named entities in the document; comparing the pre-defined set of named entities based on a context with named entities in the document; concealing the named entities identified in the document matching with the pre-defined set of named entities; and providing as output a document, wherein the set of pre-defined named entities have been concealed based on the identified user access.

20 Claims, 5 Drawing Sheets

DRAFT ▇ A

8-/3

9 June 1953

MEMORANDIM FOR THE RECORD

SUBJECT:    Project MXULIBA, Subproject B

1. Subproject B is being set up as a need to continue the Present work in the general field of L.S.D. at ▇▇▇ B ▇▇ until 13 September 1953.

2. This project will include a continuation of a study of the biochemical,neurophysiological,sociological,and clinical psychiatric aspects of L.S.D.,and also a study of L.S.D. antagonists and drugs related to L.S.D.,such as L.A.F. A detailed proposal is attached. The principle investigators will continue to be ▇▇▇ C ▇▇ all of ▇▇▇ B ▇▇

— 110
— 120
C
B
B

3. The estimated budget of the project at ▇▇▇ B ▇▇ is $39,500.00. The ▇▇▇ will serve as a cut-cut and cover for this project and will furnish the above funds to the ▇▇▇ as a philanthropic grant for medical requests. A service charge of $790.00 (2% of the estimated budget) is to be paid to the ▇▇▇ for the service. B 4. Thus the total charges for this project will not exceed $40.290.00 for a period ending September 11, 1954.

5. ▇▇▇ {Director of the C hospital} are cleared through TOP SECRET and are aware of the true purpose of the project.

for ▇▇▇ A
Chemical Division/ISS

Approved:

Chief, Chemical Division/Iss

Program

FIG. 1
(Prior Art)

ANONYMIZING SELECTED CONTENT IN A DOCUMENT

BACKGROUND OF THE INVENTION

1. Technical Field

The present invention relates to anonymizing selected information or content within a document, and more particularly to identifying and concealing by appropriate means all sensitive or critical contents from the document based on user access privileges and a context, such that the document may be distributed to across a broader audience.

2. Description of the Related Art

Documents containing private and sensitive information occasionally need to be released to a broader audience. U.S. Pat. No. 7,184,947 describes a document anonymity setting device comprises a document input means inputting a document, a specificity calculating means extracting an expression specifying a person from the input document and for calculating a specificity to evaluate a degree of specificity at which the expression specifying a person, and an anonymity setting processing means rewriting with anonymity setting a expression in the input document having a specificity which is greater than a predetermined threshold. The specificity calculating unit extracts a person name and a modification expression from the input document and calculates a specificity to evaluate a degree of specificity at which the person name and modification expression thus extracted can specify a person. The anonymity setting processing unit rewrites a person name and a modification expression which have specificity greater than a predetermined threshold through rewriting to meaningless expression, rewriting to low specificity setting, and rewriting to encrypted expression. This document deals with the problem of automatically identifying the sensitive personal information in a given document. This is done by first identifying personal names and modifying expression via lexical and syntactic analysis. Next, the probability of these identifying a specific person is calculated. Phrases having a probability more than a threshold are removed.

In recent years, the document data which include personal information. For example, there are questionnaire answers, a complaint or an electronic mail. There is a problem in that the existence of a company is threatened if the personal information leak out of a company. Therefore, it is necessary to properly conceal information about personal information before analyzing the document data. Conventionally, personal information such as person name, phone number, credit card number, and etc. included in the document data or the like have been concealed manually. In the conventional concealment of the personal information, however, it is hard for a worker to decide whether a modification expression related to a personal name or a person which is described belongs to information protected as the personal information or does not need to be protected like information about a public person. Therefore, there is a problem in that the properness for concealing the personal information is varied depending on each person. For this reason, when a worker conceals a personal data the worker's skill and knowledge for concealing the personal information should exceed a certain level. Therefore, the cost of concealing the personal information manually is increased easily.

For example, the fight to information regulations in most countries allows general public to request access to government documents. In most cases such documents contain sensitive information not critical to the information sought. There is a need therefore to sanitize (redact) the document by removing terms in the document that tend to disclose sensitive information. The sanitized document gives away limited information while keeping away the sensitive information in the document. FIG. 1 illustrates an example U.S. government document 100 that has been sanitized prior to release. The document 100 contains content or information 110 which are visible to a reader and contents that have been blackened 120 which are not visible to a reader of the document. The document 100 is a typical example of a sanitized document which gives limited information to a reader. In this particular case, the sanitized document 100 gives limited information, such as the purpose and the funding amount, on an erstwhile secret medical research project, while hiding the names of the funding sources, principal investigators and their affiliation, which is not required to be disclosed to general readers of the document.

A disadvantage with known systems and method of sanitizing documents manually makes it subjective and prone to judgmental errors. Moreover, given the amount of effort involved and limited supply of qualified reviewers, manual sanitization is an expensive and time-consuming process. Therefore, without a way to provide an improved method of sanitizing documents, specifically contents available within a document, the promise of this technology may never be fully achieved.

SUMMARY

A method and system for anonymizing (concealing) critical and/or sensitive information in a document is disclosed. The concealing of critical and/or sensitive information in a document is hereinafter referred to as sanitization of a document. Sanitization of a document involves removing sensitive information from the document, so that it may be distributed to a broader audience. Such sanitization is needed while declassifying documents involving sensitive or confidential information such as corporate emails, intelligence reports, medical records, etc. The present invention is a system and method that performs automatic sanitization of a document with the help of a database containing information about a set of entities. Further, access control is defined over the database that defines specific access for each user, defining the subset of entities that the user is authorized to access. A document is taken as input along with the identity of a user, the user being the intended viewer of the document. The document is then sanitized by removing the pre-defined terms such that the user cannot match the sanitized document with any entity that the user is not authorized to access. A small set of terms is identified to remove so that the distortion caused on the document is kept minimal.

The method and system in accordance with the present invention is configured to exploit a database of entities to identify the most important pre-defined terms to be removed from the document. The terms are identified after considering the overall information (hereinafter also referred to as content) present in a document causing minimal distortion to the document. The method and system sanitizes a given document in a dynamic fashion based on the access rights accorded for the viewer who has the rights to view the document with the following properties: (i) only the information a viewer is not allowed to see is hidden from view. (ii) The output sanitized document can be different for two different persons with different access rights. Other embodiments are also disclosed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1 (prior art) illustrates an example U.S. government document 100 that has been sanitized prior to release.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 2A:
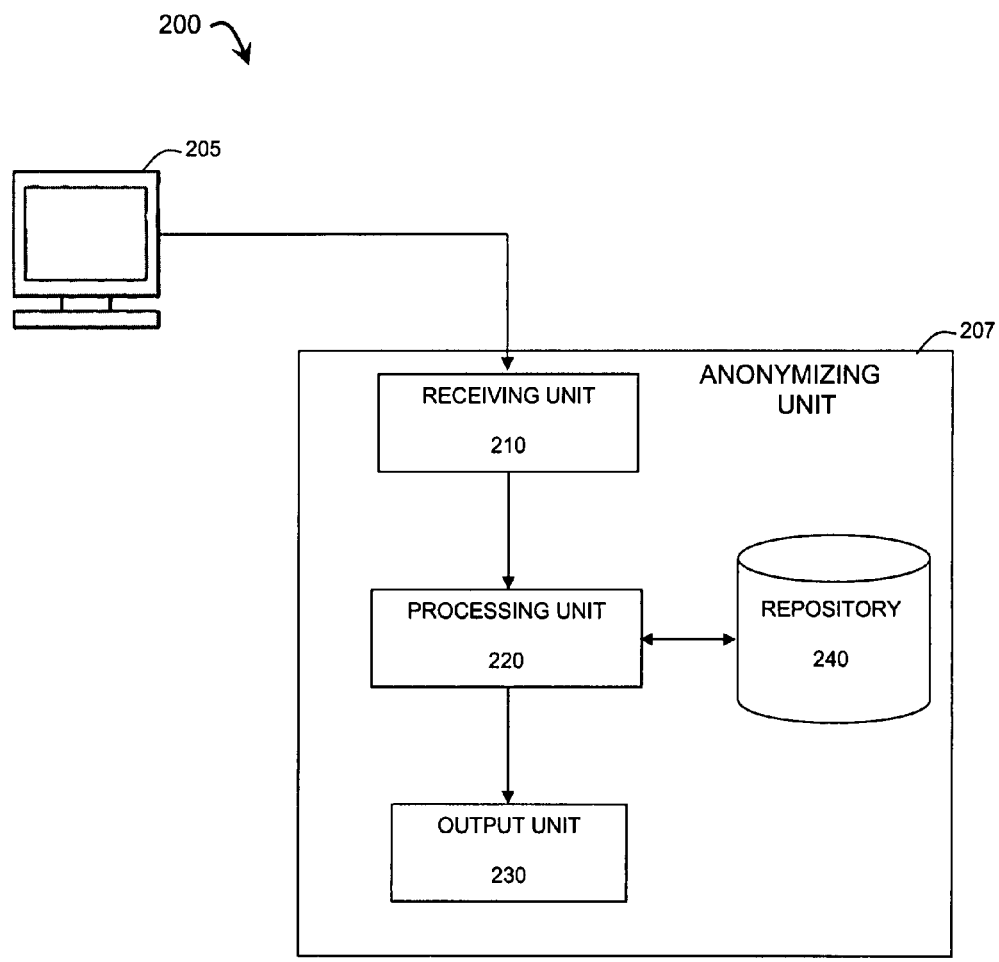
FIG. 2A illustrates an exemplary embodiment of a system 200 with a document anonymity setting unit according to the present invention.
Figure 2B:
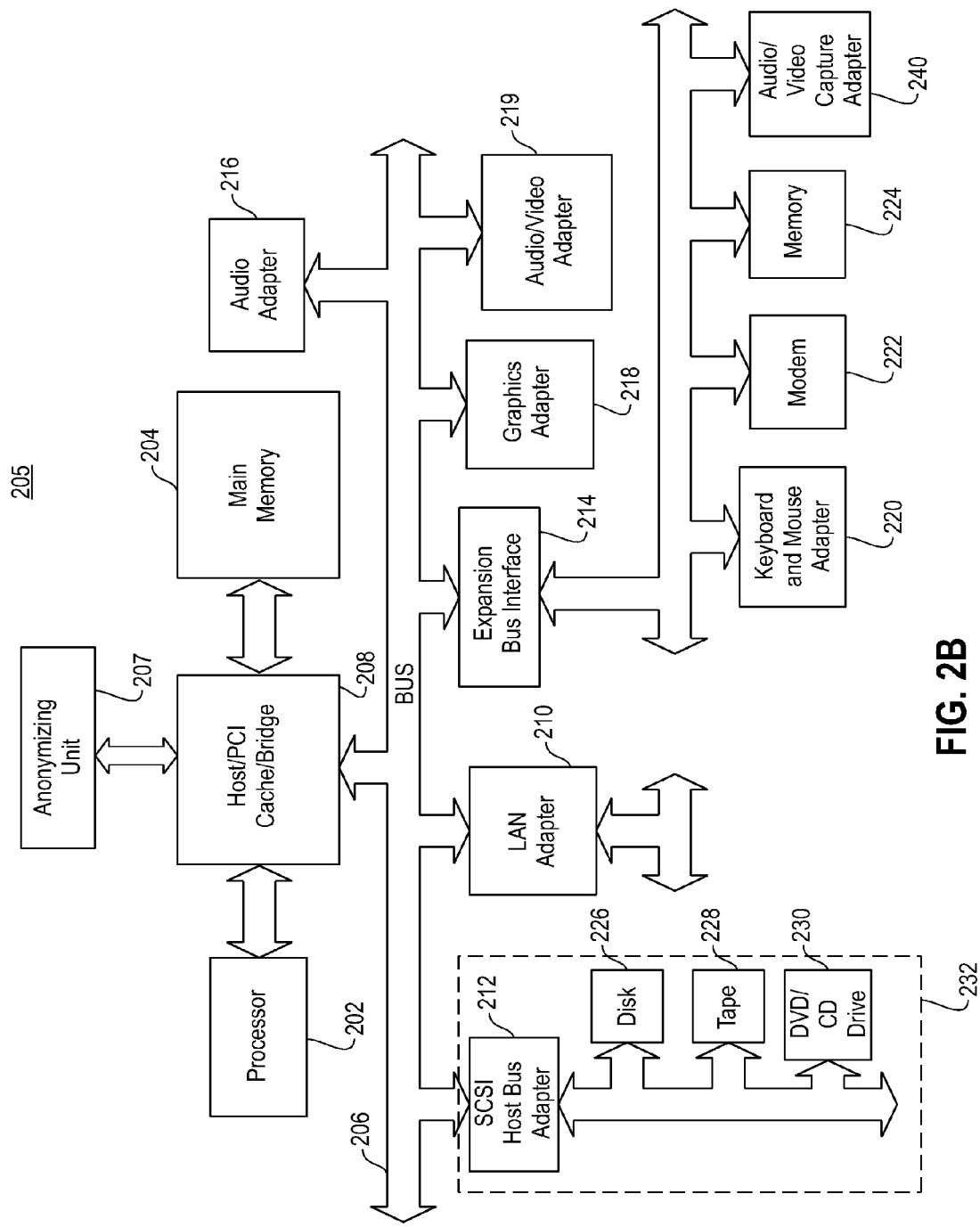
FIG. 2B illustrates an exemplary block diagram of the system 205 with the anonymity setting unit in accordance with the present invention.

FIGS. 2A and 2B depict an exemplary embodiment of a pictorial representation of a system 200 consisting of a number of computing device 205 coupled with a document anonymity setting unit 207 which the present invention may be implemented. In accordance with one embodiment of the invention, the computing device can include devices such as a desktop computer, laptop computer, Personal Digital Assistants, Mobile Phones etc. It should be apparent to a person skilled in the art that any device comprising at least a memory and a processor capable of performing computations or executing any software instructions on the processor falls within the scope of this invention.

The system 200 consisting of a computing device 205 which is coupled to a anonymizing unit 207. The anonymizing unit 207 further consists of a receiving unit 210 which is configured to receive a document. The anonymizing unit also 207 also consists of a processing unit 220 which is coupled to a repository 240. The document provided as input to the system 200 is finally output by the output unit 230 after the document has been processed by the processing unit 220.

In accordance with the present invention, a document containing content and is provided as an input. Content is typically created by individuals, institutions and technology to benefit audience in a certain context. In one embodiment of the invention, the document can be in the form of an electronic mail, a technical report, a medical report, an insurance report, a document containing textual content, a document containing textual content and objects such as images, web pages and so on. It should be obvious to a person skilled in the art that any content represented in the form of a document falls within the scope of this invention. Typically such a document, containing content or information, contains confidential or secure data which may not be required to be viewed by all users having access to the document. When accessed by viewers without privileges such confidential or secure content, should be filtered and a document presented to the viewer will not contain such confidential and/or secure information.

FIG. 2B is a block diagram illustrating a computing device 205 in which the invention may be implemented. The computing device 205 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 202 are connected to PCI local bus 206 through PCI bridge 208. PCI bridge 208 also coupled the anonymizing unit 207 and may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, additional memory 224 and an audio/ video capture adapter 240. Small computer system interface (SCSI) host bus adapter 212 provides a connection for hard disk drive 226, tape drive 228, and CD/DVD-Drive 230. Typical PCI local bus implementations will support three or four PCI expansion slots or add-in connectors.

An operating system runs on processor 202 and is used to coordinate and provide control of various components within the computing device 205 of FIG. 2B. The operating system may be a commercially available operating system, such as Windows XP®, which is available from Microsoft Corporation or AIX®, which available from International Business Machines Corp. An object oriented programming system such as Java may run in conjunction with the operating system and provide calls to the operating system from Java programs or applications executing on data processing computing device 205. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

A program or software stored on the storage device directly loadable into the internal memory of a computing device 205, is typically referred to as a computer program product. The software typically containing code or set of instructions tangibly embodied in a data signal configured to anonymize selected content (the classified and/or secure content) in the document which is provided as an input to the computing device 205, and the computer program product when executed on the computing device is capable of performing anonymizing of the selected content from the document provided as input to the system.

The process of anonymizing includes receiving as input a document comprising content at the computing device 205. Once the document containing content is received, a set of users to view the document is identified and user access privileges to the users based on an access control policy are assigned to the selected users. In one embodiment, the access control policy for the user based on a context and a set of pre-defined named entities stored in a repository. Named entities, i.e., the confidential content is identified in the document. The named entities that are identified in the document are compared with the named entities that are pre-defined based on the context and retrieved from a repository. For all matching named entities in the two set, the named entities are concealed from the user based on the access privileges that are defined based on the context. After the terms are concealed, the document is verified, and the new document generated with the confidential terms concealed are output to the user for viewing.

Those of ordinary skill in the art will appreciate that the hardware in FIG. 2B may vary depending on the implementation. Other internal hardware or peripheral devices, such as flash ROM (or equivalent nonvolatile memory) or optical disk drives and the like, may be used in addition to or in place of the hardware depicted in FIG. 2B. Also, the processes of the present invention may be applied to a multiprocessor data processing system. The depicted example in FIG. 2B and above described examples is not meant to imply architectural limitations. For example, system 200 of FIG. 2A containing the computing device 205 of FIG. 2B also be a portable electronic devices or hand held devices or may also be a kiosk or a Web appliance.

Figure 3:
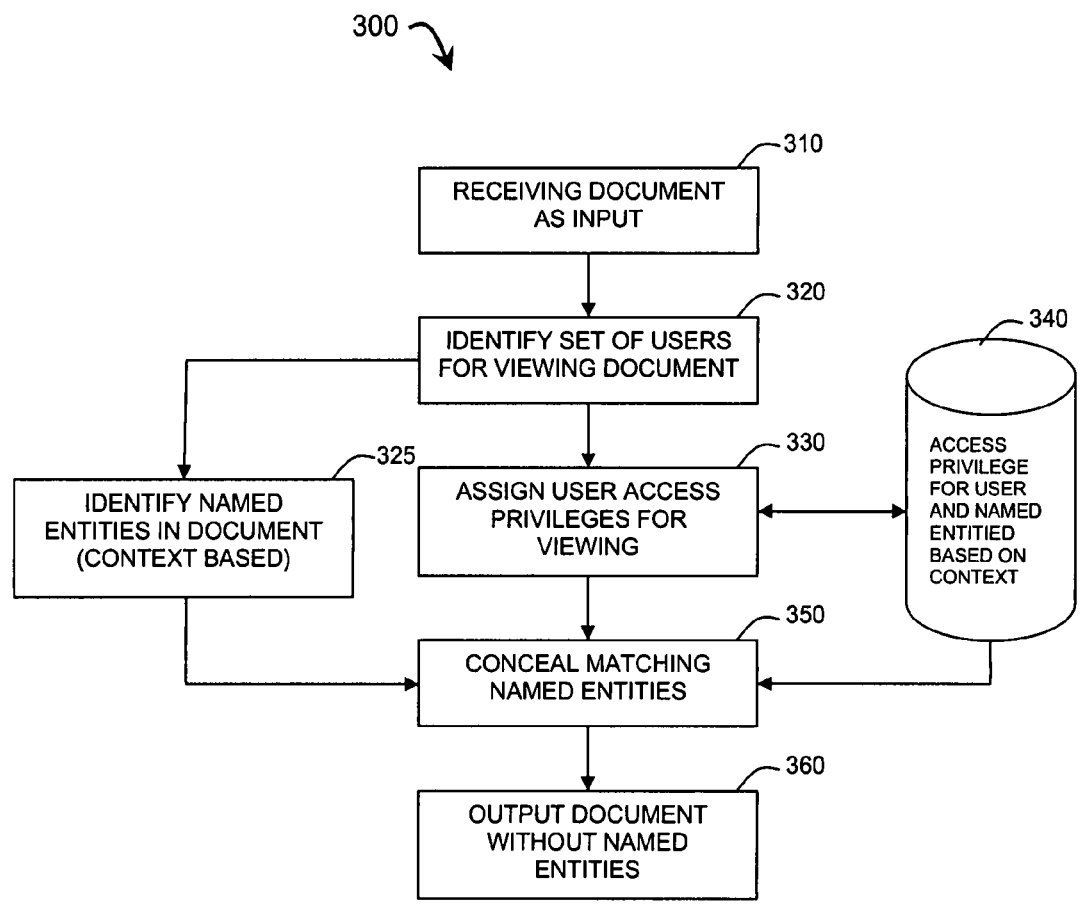
FIG. 3 illustrates an exemplary embodiment of a method 300 that is executed in accordance with the present invention.

FIG. 3 illustrates an exemplary embodiment of a method 300 that is executed in accordance with the present invention. In step 310 a document containing content is received as input. A document that has no content which is received is not processed. The document received as input in step 310 is identified either by the system 200 defined in FIGS. 2A and 2B or may be requested by a user or set of users. In step 320, the set of user for viewing the document may be determined. Each of the user identified in the set of user to view the contents of the document will be assigned user access privileges to the contents based on the user itself and also on the context of the document. In step 330, user access privileges are assigned to the user based on the context of either preparations of the document or viewing of the document. Based on the context, a set of pre-defined named entities (confidential or secure entities) is defined and these can vary for each use depending on the users' hierarchy. For example, in one context User1 can be assigned privileges to view all content except the names of people appearing in the content of the document, whereas in another context the same User1 may have different privileges, wherein User1 may not be permitted to view any financial data in the document.

The user access privileges and the context, the set of pre-defined named entities is advantageously stored in a repository 340. Maintaining such data in the repository 340 is advantageous to decide user access privileges based on the context the document was prepared and the context the document needs to be viewed. In step 325, while user access is being processed, a set of named entities (confidential or secure content) is identified within the document itself. In one embodiment, these could be generic content that is present in the repository 340 or based on the context the document was prepared or based on the context the document is being viewed or a combination of any of these.

Once the named entities are identified in the document and the user access privileges and the set of pre-defined named entities are available from the repository 340, the two set of named entities are compared and a matching is performed between the set of named entities. Preferably, all named entities that are identified in the pre-defined set of named entities from the repository 340, based on the various different conditions described previously are concealed in the document and a validity check is performed on the document. After the validity check is performed, a new document is output in step 360, wherein the new document that is output has all named entities identified concealed.

In one embodiment, the repository is preferably a structured database. The named entities preferably include security sensitive words, characters or objects, where the objects may be data objects, images etc. Advantageously, in accordance with the present invention only a minimum number of named entities that are identified are concealed in the document thereby making the process simpler, secure and faster to implement.

Figure 4:
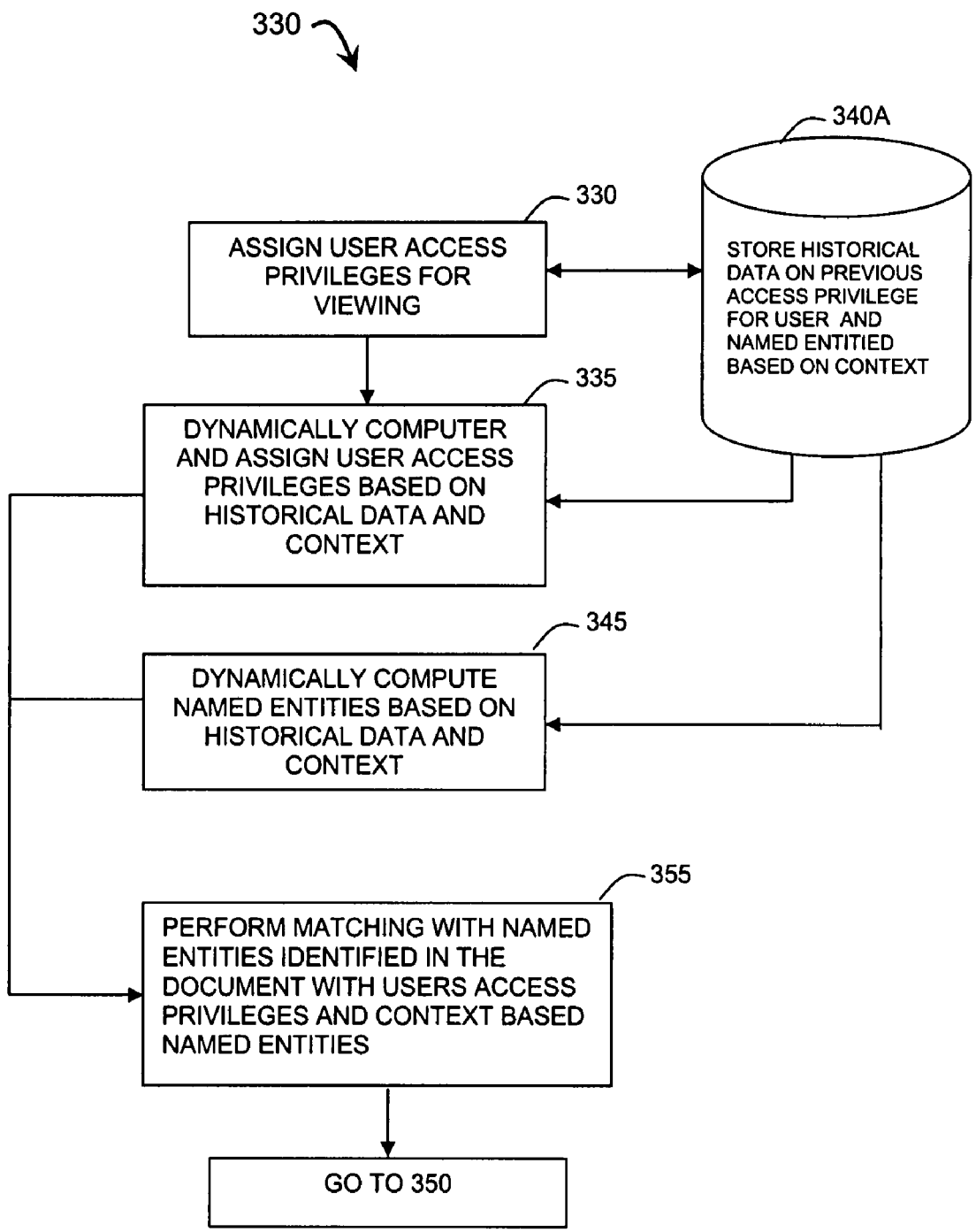
FIG. 4 illustrates an exemplary embodiment of the step 330 of FIG. 3.

FIG. 4 illustrates an exemplary embodiment of the step 330 of FIG. 3. In one embodiment, the repository 340A is also configured to store historical data on previous access privileges for users, which will advantageously be used for creating a user access control policy. Based on the historical data in step 335, the user access privilege can be dynamically computer and in step 345, the named entities based on the historical data and the context, thereby dynamically assign the context and the user access privilege. The results of step 335 and 345 are advantageously combined to performing matching of named entities which have been dynamically computed, for example by the system 200 of FIG. 2, and control is then passed to step 350 of FIG. 3.

Anonymization of selected content in a document, involves removing sensitive information from the document, so that it may be distributed to a broader audience. Such anonymization is needed while declassifying documents involving sensitive or confidential information such as corporate emails, intelligence reports, medical records, etc. Consider for example, a publicly available database of entities (persons, products, diseases, etc.). Each entity in this database is associated with a set of terms related to the artifact represented by the entity, where the set of terms is defined by the context of the entity. Assume that some of the entities in the database are considered protected; these are the entities that need to be protected against identity disclosure. For instance, in a database of person entities, the secret agents can be marked as protected—we are interested in protecting the privacy of these agents in intelligence reports, it does not matter if the identity of any other person is revealed.

Several users of the database and access control are defined for each user. The access control specifies the subset of entities that the user is authorized to see; the rest of the entities are considered protected for the particular user. Thus, the set of protected entities may differ according to the intended viewer of the document. Given a document, a user (an intended viewer of the document) can match the terms present in the document with the terms present in the context of each of the protected entities. If the document contains a group of terms that appear together only in the context of a particular entity, then the user gets an indication that the entity is being mentioned in the given document. This is prevented by removing certain terms from the document—these terms need to be selected such that no protected entity can be inferred as being mentioned in the document by matching the remaining terms with the entity database.

The input to the system 200 of FIGS. 2A and 2B is a document, and the identifier of the person who wants to view the document (the viewer), a database of entities E (typically defined in a repository 240), a parameter K (higher value of K means higher level of privacy needed). The output is a document wherein selected terms have been anonymized thereby providing what is typically referred to as a sanitized document with the smallest number of terms removed.

This is performed by the following steps. Based on the identity of the viewer, get the set of entities L in the database that should not be disclosed to the viewer, which are dependent on a context, the context either being the time of preparation of the document or the viewing context of the document or any other such context. This list is maintained implicitly or explicitly by the system 200 for each user, and is similar to the access control list (ACL) maintained in database systems. Let T be the set of terms (named entities) in the given document. For each subset S of T (considered in order of increasing cardinality). Consider the document D' obtained by removing all occurrence of the terms in S from the given document(set of terms in D'=T−S). For each subset S' of T−S, Let P be defined as the set of entities in E that contain all the terms in S'. If (a) the size of P is less than K, and (b) L and P contain a common entity, then S' is "dangerous". If no dangerous subsets found in step (b), return D' as the output.

A pseudo code for generating the sanitized document is outlined below:

Input:

(i) A database of entities E, along with access control mechanism that identifies for each user, a subset of entities that the user is authorized to see.

(ii) A document D.

(iii) A security parameter K.

(iv) The identity of a user u, who is the indented viewer of the sanitized output document Output: A anonymized (sanitized) document obtained from D.

Procedure:

1. Parse the document and identify a set of relevant terms T in the document.
2. Using the access control mechanism, find the set $L \subseteq E$ of entities that are protected for the given user u.
3. For each subset $S \subseteq T$ do:
   (a) Find the entities P which contain all terms in S in their context i.e.

$$P = |\{e \in E | S \subseteq C(e)\}|$$

(b) if P has less than K entities and L and P have a common entity, mark S as dangerous.
4. Let T* be the largest set that was not marked dangerous in Step 3.
5. Output T*

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

While particular embodiments of the present invention have been shown and described, it will be obvious to those skilled in the art that, based upon the teachings herein, that changes and modifications may be made without departing from this invention and its broader aspects. Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for anonymizing selected content in a document, the method comprising:

receiving as input a document comprising content;

determining a first context in which said document was prepared;

determining a second context in which said document is permitted to be viewed;

identifying named entities and at least two types of named entity data of said named entities in the document based on said first context and said second context;

assigning a user access privilege to said user based on historical data of previous access privileges for said user, said first context, and said second context;

comparing the named entities identified in the document with a pre-defined set of named entities and at least one type of named entity data identified for said user with said user access privilege to view the document based on the first context and the second context;

concealing the named entities identified in the document that match with the pre-defined set of named entities and said at least one type of named entity data; and providing as output an anonymized document to the user, wherein the set of pre-defined named entities and said at least one type of named entity data have been concealed, and another of said at least two types of named entity data of said named entities is displayed to said user, but is concealed to another user without said user access privilege.

2. The method of claim 1, further comprising:
assigning user access privileges to the identified users to view the document based on an access control policy, the access control policy for the user is based on a context.

3. The method of claim 1, wherein the pre-defined set of named entities and access control policy are stored in a repository.

4. The method of claims 3, wherein the repository is a structured database.

5. The method of claim 1, wherein the named entities include security sensitive words, characters or objects.

6. The method of claim 5, wherein the objects include data objects or images.

7. The method of claim 1, wherein the user access privileges for viewing the document vary for the users depending on the context.

8. The method of claim 7, wherein the user access privileges are dynamically assigned.

9. The method of claim 8, wherein rules for dynamically assigning user access privileges are based on historical data stored in a repository.

10. The method of claim 1, wherein the document includes electronic mails or reports or web pages.

11. The method of claim 1, wherein said at least two types of named entity data of said named entities further comprise one of names of people and financial data.

12. A system comprising:
a receiving unit for receiving a document as input, the document comprising content;
a processing unit configured to:
   determine a first context in which said document was prepared;
   determine a second context in which said document is permitted to be viewed;
   identify named entities and at least two types of named entity data of said named entities in the document based on said first context and said second context;
   assigning a user access privilege to said user based on historical data of previous access privileges for said user, said first context, and said second context;
   compare the named entities identified in the document with a pre-defined set of named entities and at least one type of named entity data identified for said user with said user access privilege to view the document based on the first context and the second context,
   match the named entities in the document with the pre-defined set of named entities and said at least one type of named entity data; and
   conceal the matching named entities; and
a output unit configured to output an anonymized document, wherein the named entities in the document matching with the set of per-defined named entities and said at least one type of named entity data that are context oriented are concealed, and another of said at least two types of named entity data of said named entities is displayed to said user, but is concealed to another user without said user access privilege.

13. The system of claim 12, wherein the processing unit is further configured to assign user access privileges to the identified users to view the document based on an access control policy, the access control policy for the user is based on a context.

14. The system of claim 13, wherein the pre-defined set of named entities and access control policy are stored in a repository, and the repository is a structured database.

15. The system of claims 12, wherein the named entities includes security sensitive words, characters or objects.

16. The system of claim 12, wherein user access privileges for viewing the document vary for the users depending on the context.

17. The system of claim 16, wherein the user access privileges are dynamically assigned based on historical access data stored in a repository.

18. The system of claim 14, wherein the documents includes electronic mail or reports or web pages.

19. The system of claim 12, wherein said at least two types of named entity data of said named entities further comprise one of names of people and financial data.

20. A computer storage medium readable by a computing device tangibly embodying a program of instructions executable by said computing device for performing a method to anonymize selected content in a document, said method comprising:
receiving as input a document comprising content;
determining a first context in which said document was prepared;
determining a second context in which said document is permitted to be viewed;
identifying named entities and at least two types of named entity data of said named entities in the document based on said first context and said second context;
assigning a user access privilege to said user based on historical data of previous access privileges for said user, said first context, and said second context;
comparing the named entities identified in the document with a pre-defined set of named entities and at least one type of named entity data identified for said user with said user access privilege to view the document based on the first context and the second context;
concealing the named entities identified in the document that match with the pre-defined set of named entities and said at least one type of named entity data; and
providing as output an anonymized document to the user, wherein the set of pre-defined named entities and said at least one type of named entity data have been concealed, and another of said at least two types of named entity data of said named entities is displayed to said user, but is concealed to another user without said user access privilege.

* * * * *